United States Patent [19]

Hunter

[11] Patent Number: 4,709,946

[45] Date of Patent: Dec. 1, 1987

[54] LINED PIPE JOINT

[76] Inventor: John J. Hunter, P.O. Box 3879, Abilene, Tex. 79603

[21] Appl. No.: 17,174

[22] Filed: Feb. 20, 1987

[51] Int. Cl.⁴ .............................................. F16L 9/14
[52] U.S. Cl. ..................................... 285/55; 285/355; 285/369
[58] Field of Search .................... 285/53, 55, 355, 369

[56] References Cited

U.S. PATENT DOCUMENTS

| | | | |
|---|---|---|---|
| 3,307,860 | 3/1967 | Blount et al. | 285/55 |
| 3,338,598 | 8/1967 | Kurtz | 285/55 |
| 3,758,361 | 9/1973 | Hunter | 285/53 X |
| 3,811,710 | 5/1974 | Dula et al. | 285/55 |
| 3,943,273 | 3/1976 | Jan de Putter | 285/55 X |
| 4,484,770 | 11/1984 | Sloane | 285/55 |

FOREIGN PATENT DOCUMENTS 24355 of 1904 United Kingdom .................. 285/55

Primary Examiner—Dave W. Arola
Attorney, Agent, or Firm—Kanz, Scherback & Timmons

[57] ABSTRACT

Disclosed is a method and apparatus for forming a pipe joint for securing lined pipe sections together. A portion of the liners of adjacent pipe sections are overlapped and compressed when the pipe joint is made up so as to seal against the migration of pressurized fluids from within the pipe sections.

3 Claims, 2 Drawing Figures

LINED PIPE JOINT

Plastic lined pipe sections have long been used for conducting acids, caustics, salt water and other corrosive fluids. For instance, U.S. Pat. No. 3,758,361 entitled "Process For Lining Pipe Joints" issued to Hunter, the disclosure of which is incorporated herein for all purposes, discloses a method for lining metallic pipe sections with a plastic liner to protect the pipe sections from the effects of corrosive materials conveyed therethrough. However, existing lined pipe sections do not adequately seal at the juncture of two adjacent pipe sections against the out-migration of fluids conducted through the pipe. This is a particular problem when the fluid conveyed through the pipe sections includes pressurized gasses such as carbon dioxide. Such gasses are able to quickly migrate through conventional lined pipe joints with obvious undesirable consequences.

This invention provides a pipe joint which secures two lined pipe sections together and seals the juncture of the pipe sections against the migration of fluids through the joint and methods for forming the pipe joint. The method of this invention includes the steps of axially aligning first and second pipe sections; securing the first pipe section to the second pipe section; overlapping the liners of the first and second pipe sections; and compressing the liners of the first and second pipe sections where overlapped to seal the joint against migration of pressurized fluids through the joint.

The pipe joint provided by this method includes, in one embodiment, first pipe means having a fluid impervious first liner mounted on the interior thereof; second pipe means having a fluid impervious second liner mounted on the interior thereof; means for securing said first pipe means in axial alignment with said second pipe means wherein said first liner and said second liner are partially overlapped; and means for compressing said first and second liners were overlapped to seal the pipe joint formed at the juncture of said first and second pipe means for the transmission of fluids therethrough. Therefore, it is a principal feature and advantage of this invention to provide an improved method and apparatus for forming pipe joints which seal against migration of pressurized fluids therethrough.

So that the manner in which the above noted features and advantages of the invention as well as others which will become apparent to those skilled in the art are obtained and can be understood in detail, a more particular description of the invention briefly summarized above may had by reference to the embodiment thereof illustrated in the accompanying drawing, which drawing illustrates only a preferred embodiment of the invention and is therefore not to be considered limiting of its scope for the invention may admit to other equally effective embodiments.

Figure 1:
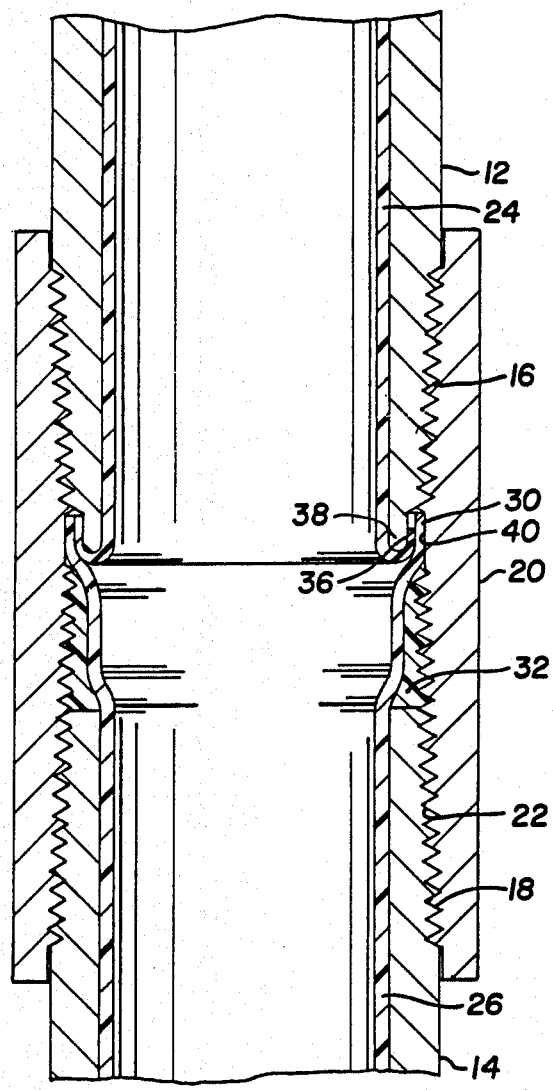
FIG. 1 is a cross-sectional view of a pipe joint formed according to the method and apparatus of this invention.
Figure 2:
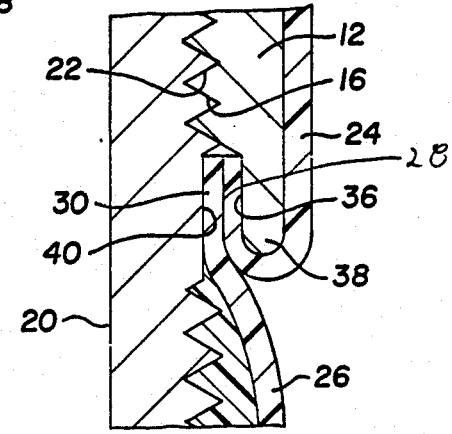
FIG. 2 is a magnified view in detail of the pipe joint of FIG. 1.

Referring now to the FIGS. 1 and 2, the pipe joint of this invention includes first pipe section 12 and second pipe section 14 placed in end to end alignment. The opposing ends of the first and the second pipe sections are tapered and externally threaded as at 16 and 18, respectively. The first and second pipe sections are secured together by a sleeve 20 having an internally threaded passageway 22 for threadedly receiving the ends of the pipe sections.

Each of the pipe sections includes a fluid impervious liner 24 and 26, respectively. The liners are preferably constructed of synthetic or plastic material. The liners 24 and 26 may be secured to the interior of the respective pipe sections as described in previously noted U.S. Pat. No. 3,758,361. The end of the first liner 24 may be formed by the process illustrated in FIGS. 1 and 3 of U.S. Pat. No. 3,758,361 so as to be flared outwardly and backwardly with respect to the first pipe section 12 and then trimmed as shown in FIG. 2. The second liner 26 extends beyond the end of the second pipe section and the exposed portion of the second liner is similarly formed so as to be flared outwardly. The flared portion of the second liner includes a rim 30 having an inner diameter at least slightly greater than the outer diameter of the first liner 24 on the exterior of the first pipe section. Thus, when the first pipe section and the second pipe section are secured together with the sleeve as shown in the drawing, the rim 30 of the second liner at least partially overlaps the exposed portion of the first liner at 28. In this manner the first and second pipe sections and the sleeve are fully lined against corrosive fluids flowing through the pipe. A plasticized annular plastic ring 32 may be interposed between the flared portion of the second liner and the threads of the sleeve to protect the second liner when the first and second pipe sections are joined.

Means are provided to seal the first and second liners against the migration of gasses and other fluids through the pipe joint. In the illustrated embodiment the sealing means includes an annular groove 36 formed on the exterior of the first pipe section by removing the threads at the tip of the first pipe section to form lip 38. Axially aligned annular groove 40 is formed in the sleeve by removing threads on the interior of the sleeve opposite the annular groove 36 on the exterior of the first pipe section. The grooves 36 and 40 are each constructed to receive the overlapped portions of the first and second liners. However, the distance separating the grooves 36 and 40 is less than the combined thickness of the overlapped first and second liners interposed therebetween.

In operation, when the first and second pipe sections are made up with the sleeve into a pipe joint, the overlapped first and second liners will be radially compressed within the groove between the first pipe section and the sleeve to seal against the migration of gasses from the interior of the pipe sections. The present invention is more effective than conventional pipe joints which, although fully lined, do not seal against the out-migration of pressurized gasses or other fluids through the joints.

Since the invention utilizes the compressive force of telescoped pipe sections exerting opposing radial forces on two liners positioned therebetween, the invention may also be employed in joining lined sections of pipe by interference fit methods. For example, the liner on the pin end can be wrapped around the end of the pipe in the same manner as shown in FIG. 1. The pin end may be tapered or grooved to accommodate the overlapped liner. The liner in the bell end will, of course, be terminated in the area of the neck or where the neck joins the bell. This end of the liner may also be tapered. Thus, when the interference joint is made, the ends of the liners will be overlapped within the throat and radially compressed by the opposing radial compressive forces of the pin end and the neck.

Although the invention has been disclosed above with regard to particular and preferred embodiments, these are advanced for illustrative purposes only and are not intended to limit the scope of this invention. For instance, it is also within the spirit and scope of the invention to construct pipe joints incorporating compressing means and overlapping liners for non-threaded lined pipe sections such as is shown in FIG. 4 of U.S. Pat. No. 3,758,361. Further, the invention may also be applied to a pair of pipe sections having opposing pin and box ends. In this embodiment of the invention an annular groove is formed on the interior of the box end opposite an annular groove on the exterior of the pin end for receiving the overlapped portions of the liners of the pipe sections with the pipe joint made up. These and other variations remain within the spirit and scope of the invention as defined by the appended claims.

What is claimed:

1. A pipe joint comprising:
   (a) first pipe means having an external annular channel adjacent the end thereof and a continuous fluid impervious liner on the internal surface thereof extending around the end face of said first pipe means and into said external annular channel;
   (b) second pipe means having a continuous fluid impervious liner on the internal surface thereof and extending from the end of said second pipe means; and
   (c) sleeve means securing the ends of said first and second pipe means together, said sleeve means having an internal channel positioned in register with said external channel in said first pipe means and securing the end of the liner extending from said second pipe means within said internal channel and overlapping the liner in said external annular channel, whereby the end of said first pipe means and said sleeve means coact to radially compress the overlapped portions of said liners.

2. A pipe joint as defined in claim 1 wherein the external surfaces of said first and second pipe means are externally threaded and mate with internal threads on said sleeve.

3. A pipe joint as set forth in claim 2 including a ring of resilient material surrounding the liner extending from the end of said second pipe means in the axial space between the end of said second pipe means and said channels.

* * * * *